United States Patent [19]

Gillemot

[11] 4,027,097

[45] May 31, 1977

[54] SPLIT COVER PLATE FOR TELEPHONE OUTLET

[75] Inventor: George W. Gillemot, Santa Monica, Calif.

[73] Assignee: John T. Thompson, Santa Monica, Calif. ; a part interest

[22] Filed: June 15, 1976

[21] Appl. No.: 696,431

[52] U.S. Cl. .............................................. 174/66
[51] Int. Cl.² ........................................ H02G 3/14
[58] Field of Search ...................... 174/66; 220/241

[56] References Cited

UNITED STATES PATENTS

| | | |
|---|---|---|
| 3,597,526 | 8/1971 | Boatwright et al. ................. 174/66 |
| 3,729,572 | 4/1973 | Helin .................... 174/66 |
| 3,749,815 | 7/1973 | Boatwright et al. .................. 174/66 |
| 3,864,512 | 2/1975 | Meadow .............................. 174/66 |

Primary Examiner—Bruce A. Reynolds
Assistant Examiner—D. A. Tone
Attorney, Agent, or Firm—Harris, Kern, Wallen & Tinsley

[57] ABSTRACT

A split cover plate for a telephone outlet comprising two interlocked plate forming members which overlap sufficiently to receive two attachment screws through each plate forming member, thereby providing the assembly of plate forming members with essentially the same rigidity as a one-piece cover plate.

3 Claims, 4 Drawing Figures

U.S. Patent  May 31, 1977  4,027,097
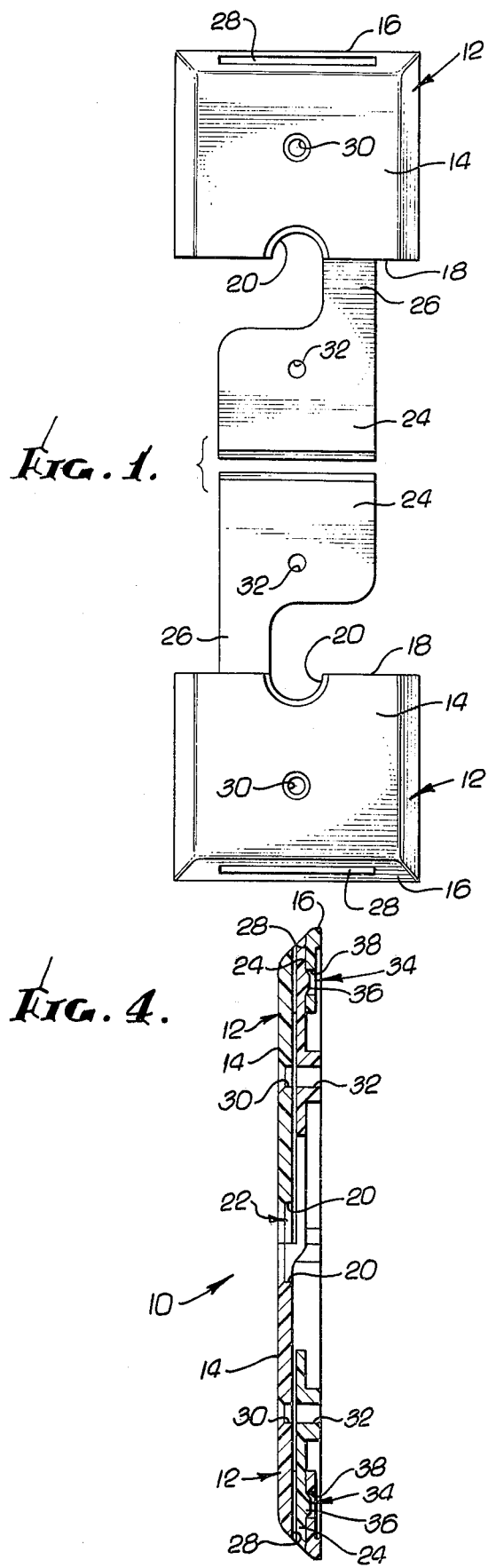
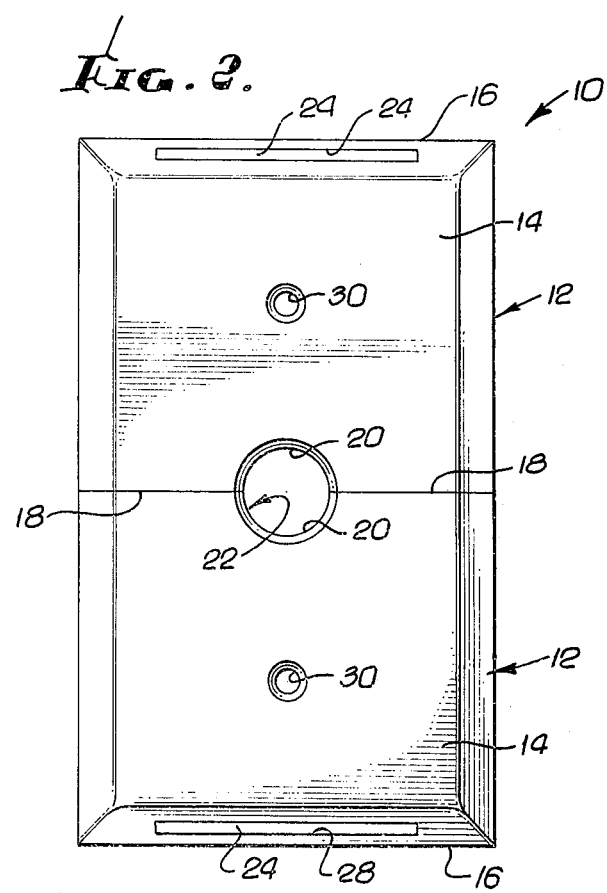
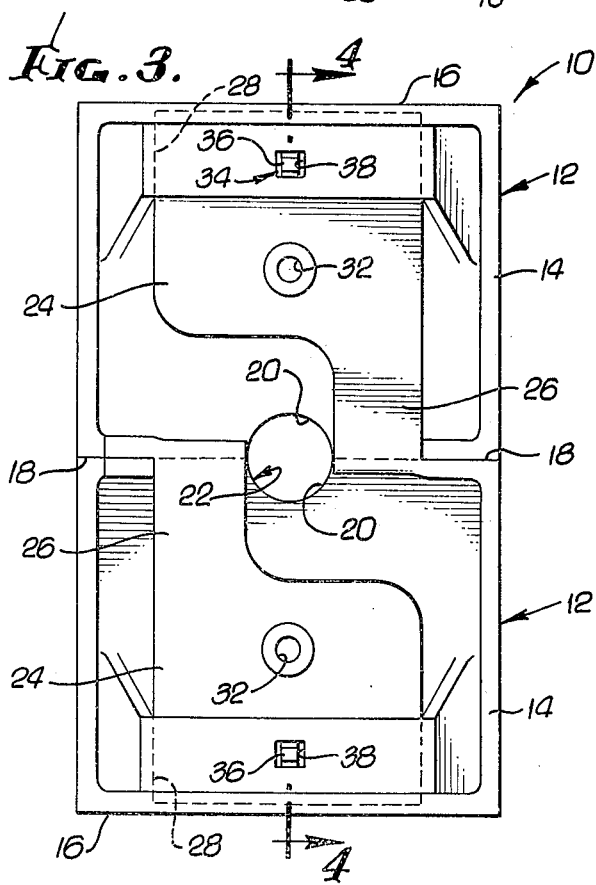

SPLIT COVER PLATE FOR TELEPHONE OUTLET

BACKGROUND OF INVENTION

The present invention relates in general to a cover plate for a telephone outlet, or the like, and, more particularly, to a split cover plate comprising two plate forming members which may be assembled around a telephone cord, or the like, to avoid any necessity for disconnecting the cord from a telephone, or other equipment, to which it is attached.

The following prior art, all U.S. patents except as indicated, is relevant:

| Patent No. | Patentee |
|---|---|
| 801,536 | Marshall |
| 1,221,652 | Badeau |
| 1,222,493 | Thomas |
| 2,374,993 | Haynes |
| 2,761,112 | Torcivia |
| 2,828,352 | Shewmon |
| 3,056,942 | Carbough et al |
| 3,428,936 | Arnao, Jr. |
| 3,467,763 | Shaw |
| 3,597,526 | Boatwright et al |
| 3,729,572 | Helin |
| 3,749,815 | Boatwright et al |
| 3,864,512 | Meadow |
| 939,117 | British Patent |

The Helin patent consititutes the most relevant prior art and disclosed a split cover plate for a telephone outlet comprising two interlocked plate forming members. The two plate forming members of Helin are relatively lightly interlocked, and are essentially plate halves each adapted to receive one attachment screw therethrough. Consequently, the assembled plate forming members of Helin, when assembled and mounted, do not provide a cover plate which is anywhere near as rigid as a conventional one-piece cover plate.

SUMMARY AND OBJECTS OF INVENTION

The primary object of the present invention is to provide a split cover plate which is adapted to be attached by two screws with each screw extending through both plate forming members. With this construction, the assembly of plate forming members has essentially the same rigidity as a conventional one-piece cover plate, which is an important feature of the invention.

Another important object is to provide a split cover plate wherein the two plate forming members overlap sufficiently in an interlocking relation to provide an assembly which is nearly as rigid as a conventional one-piece cover plate even before mounting. Thus, the assembly of plate forming members can be handled, during mounting, for example, with little possibility of their becoming disassembled, which is an important feature.

Considering the invention more specifically now, it may be summarized as including, and an important object is to provide a split cover plate which includes: two identical plate forming members having front and rear sides and respectively comprising plate halves provided with longitudinally spaced outer and inner edges, the inner edges of the plate halves being abuttable and being provided therein with complementary notches for forming an opening for receiving a telephone cord, or the like, when the inner edges abut, the plate forming members respectively including on the rear sides thereof tongues projecting longitudinally from the inner edges of the plate halves, the plate halves being provided adjacent their outer edges with tongue receiving sockets extending toward their inner edges, the tongue of each of the plate forming members being receivable in the socket in the plate half of the other of the plate forming members when the inner edges of the plate halves abut, the plate half of each of the plate forming members being provided with a screw hole registrable with a screw hole in the tongue of the other of the plate forming members when the plate forming members are assembled with the inner edges of the plate halves abutting and with the tongues in the sockets.

Another object of the invention is to provide a split cover plate wherein the tongues extend substantially to the outer edges of the plate halves, respectively, when the plate forming members are assembled with the inner edges of the plate halves abutting and with the tongues in the sockets.

A further object is to provide detent means on the plate halves and the tongues of the plate forming members for releasably locking the plate forming members together when they are assembled with the inner edges of the plate halves abutting and with the tongues in the sockets.

The foregoing objects, advantages, features and results of the present invention, together with various other objects, advantages, features and results which will become apparent in the light of this disclosure, may be achieved with the exemplary embodiment of the invention illustrated in the accompanying drawing and described in detail hereinafter.

DESCRIPTION OF DRAWING

FIG. 1 is a front elevational view of the two plate forming members of the split cover plate of the invention prior to assembly;

FIG. 2 is a front elevational view of the split cover plate of the invention with the two plate forming members thereof assembled;

FIG. 3 is a rear elevational view of the split cover plate with the two plate forming members assembled; and FIG. 4 is a sectional view taken as indicated by the arrowed line 4—4 of FIG. 3 of the drawing.

DESCRIPTION OF EXEMPLARY EMBODIMENT OF INVENTION

Referring to the drawing, the split cover plate of the invention is designated generally by the numeral 10 and includes two identical, interlockable and overlappable, plate forming members 12 having front sides, shown in FIGS. 1 and 2, and rear sides, shown in FIG. 3. The two plate forming members 12 respectively comprise plate halves 14 respectively provided with longitudinally spaced outer and inner edges 16 and 18. The inner edges 18 of the plate halves 14 abut when the plate forming members 12 are assembled, and are provided therein with complementary central notches 20 cooperating to form an opening 22 for receiving a telephone cord, or the like, when the inner edges 18 abut.

The two plate forming members 12 respectively include on the rear sides thereof tongues 24 projecting longitudinally from the inner edges 18 of the plate halves 14. The tongues 24 are provided adjacent the notches 20 with portions 26 of reduced width to permit the insertion of a telephone cord, or the like, in the notches 20 during assembly of the two plate forming members 12. The two plate halves 14 are provided adjacent their outer edges 16 with tongue receiving sockets 28 extending toward their inner edges. The tongue 24 of each of the plate forming members 12 is receivable in the socket 28 in the plate half of the other of the plate forming members when the two plate forming members are assembled, with the inner edges 18 of the plate halves 14 abutting. The manner in which the tongues 24 are received in the sockets 28 is shown clearly in FIG. 4 of the drawing. It will be noted that the over-all length of each plate forming member 12 is substantially equal to the over-all length of the split cover plate 10 formed upon assembly of the two plate forming members.

The two plate halves 14 are provided with screw holes 30 therethrough and the two tongues 24 are provided with screw holes 32 therethrough. Upon assembly of the plate forming members 12, the screw hole 30 in each plate forming member 12 registers with the screw hole 32 in the other plate forming member 12. Thus, when the split cover plate 10 is mounted by mens of two screws, each screw extends through a screw hole 30 in one of the plate forming members and a screw hole 32 in the other. This provides the assembly of the two plate forming members 12 with essentially the same rigidity as a one-piece cover plate, which is an important feature. Also, since the lengths of the plate forming members 12 are substantially equal to the length of the assembled cover plate 10, there is sufficient overlap to provide a split cover plate which is nearly as rigid as a one-piece cover plate even before mounting, which is another important feature.

To assist in holding the two plate forming members 12 of the split cover plate 10 assembled prior to mounting of the split cover plate, detent means 34, FIG. 4, are provided for interlocking the two plate forming members. Each detent means 34 includes a detent 36 on the corresponding tongue 24 and receivable in a detent opening 38 in one wall of the corresponding socket 28. With this construction, the two plate forming members 12 are rigidly interlocked upon assembly, which is an important feature.

Although an exemplary embodiment of the invention has been disclosed for illustrative purposes, it will be understood that various changes, modifications and substitutions may be incorporated in such embodiment without departing from the invention as hereinafter claimed.

I claim as my invention:

1. A split cover plate for a telephone outlet, or the like, including two identical plate forming members having front and rear sides and respectively comprising plate halves provided with longitudinally spaced outer and inner edges, said inner edges of said plate halves being abuttable and being provided therein with complementary notches for forming an opening for receiving a telephone cord, or the like, when said inner edges abut, said plate forming members respectively including adjacent the rear sides thereof tongues projecting longitudinally from said inner edges of said plate halves, said plate halves being provided adjacent their outer edges with tongue receiving sockets extending toward their inner edges, said tongue of each of said plate forming members being receivable in said socket in said plate half of the other of said plate forming members when said inner edges of said plate halves abut, said plate half of each of said plate forming members being provided with a screw hole registrable with a screw hole in said tongue of the other of said plate forming members when said plate forming members are assembled with said inner edges of said plate halves abutting and with said tongues in said sockets, and detent means on said plate halves and said tongues of said plate forming members for releasably locking said plate forming members together when they are assembled with said inner edges of said plate halves abutting and with said tongues in said sockets.

2. A split cover plate as set forth in claim 1 wherein said tongues extend substantially to said outer edges of said plate halves, respectively, when said plate forming members are assembled with said inner edges of said plate halves abutting and with said tongues in said sockets.

3. A split cover plate for a telephone outlet, or the like, including two identical plate forming members having front and rear sides and respectively comprising plate halves provided with longitudinally spaced outer and inner edges, said inner edges of said plate halves being abuttable and being provided therein with complementary notches for forming an opening for receiving a telephone cord, or the like, when said inner edges abut, said plate forming members respectively being provided between the front and rear sides thereof with tongues projecting longitudinally from said inner edges of said plate halves, said plate halves being provided between their front and rear sides with internal tongue receiving sockets extending from their outer edges toward their inner edges, said tongue of each of said plate forming members being receivable in said internal socket in said plate half of the other of said plate forming members when said inner edges of said plate halves abut, said plate half of each of said plate forming members being provided with a screw hole in said tongue of the other of said plate forming members when said plate forming members are assembled with said inner edges of said plate halves abutting and with said tongues in said sockets.

* * * * *

UNITED STATES PATENT AND TRADEMARK OFFICE
CERTIFICATE OF CORRECTION

PATENT NO. : 4,027,097
DATED : May 31, 1977
INVENTOR(S) : George W. Gillemot

It is certified that error appears in the above-identified patent and that said Letters Patent are hereby corrected as shown below:

Column 3, line 22, "mens" should be --means--;

Column 4, line 50, after "hole" add --registrable with a screw hole--;

Signed and Sealed this twenty-third Day of August 1977

[SEAL]

Attest:

RUTH C. MASON
Attesting Officer

C. MARSHALL DANN
Commissioner of Patents and Trademarks